United States Patent Office 3,397,768
Patented Aug. 20, 1968

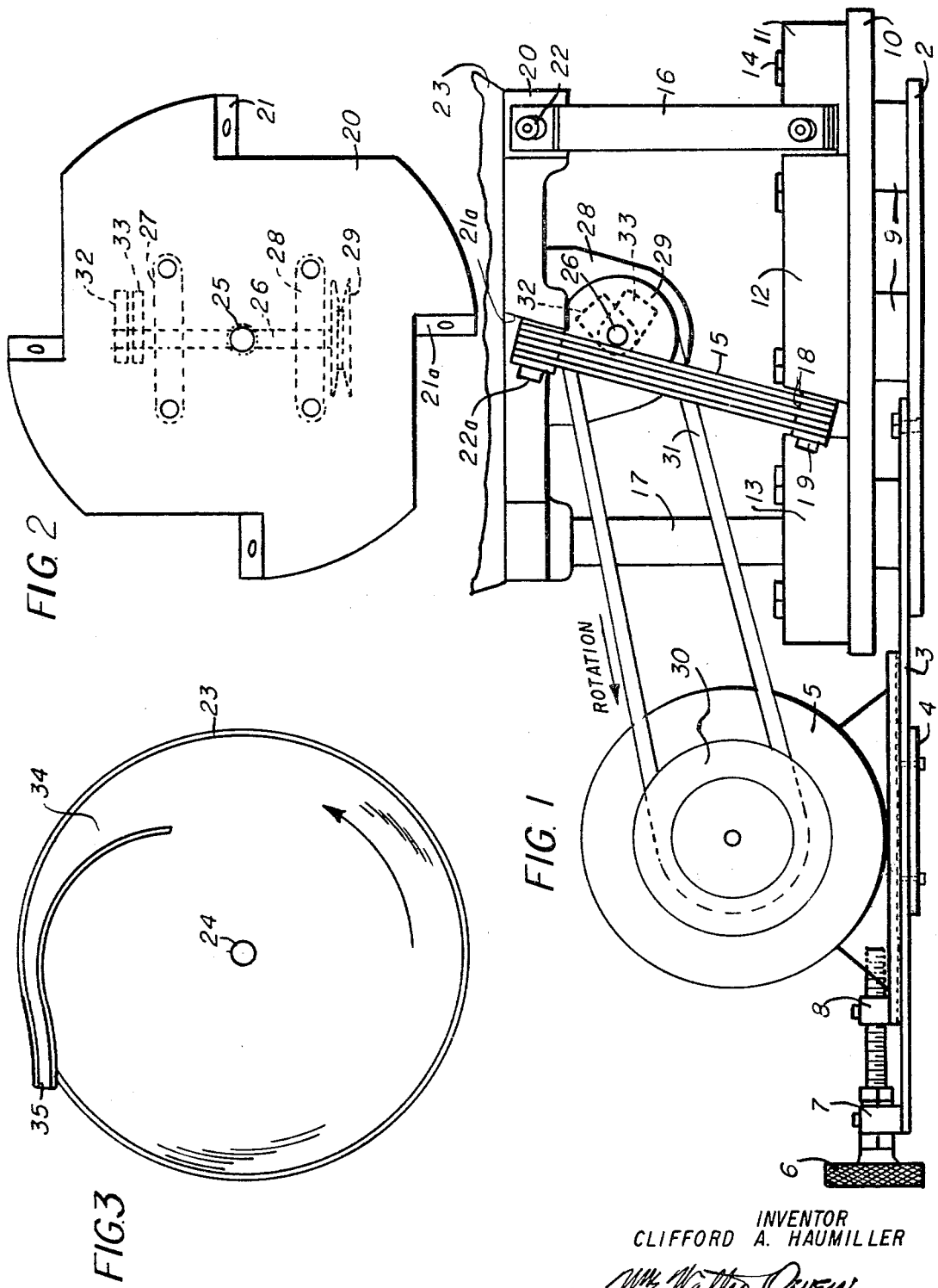

3,397,768
VIBRATIONAL FEEDING DEVICES
Clifford A. Haumiller, 960 E. Chicago, St.,
Elgin, Ill. 60120
Filed June 3, 1966, Ser. No. 555,063
2 Claims. (Cl. 198—220)

ABSTRACT OF THE DISCLOSURE

A vibratory feeding device for feeding parts from a hopper to a discharge point using eccentric weights on a rotating shaft and upright heavy springs under the hopper to cause an orbital rotation of the hopper.

---

My invention relates in general to conveyors and more specifically to a vibratory circular feeding device for feeding discrete parts from a hopper along a path to a discharge point where they may be discharged one at a time.

The invention consists mainly in the arrangement of the vibration means consisting of a pair of eccentric weights mounted on a horizontal shaft mounted in bearings on the underside of a hopper supporting plate, the plate being mounted on the upper ends of a plurality of heavy springs which are secured at the lower end to a rigid base and extend upward at an angle to the base. The shaft is rotated by means of a motor secured to the base and linked to the shaft by means of a belt and pulley arrangement so that the shaft may freely rotate and vibrate and thus cause the hopper and plate to be vibrated in an orbital or curvilinear path. The discrete parts in the hopper are thus agitated and caused to move around in the hopper and follow a curved and slowly rising path formed in the inner circumference of the hopper to a discharge point. The motor has a spring loaded pulley for driving the belt and the motor is adjustable toward and away from the shaft to increase or decrease the speed at which the shaft is driven by the belt.

Having briefly described the general features of the device I will now describe the same more in detail by reference to the accompanying drawing in which:

FIG. 1 is a side view of vibrating arrangement including the base, the motor and hopper supporting plate.

FIG. 2 is a top view of the hopper supporting plate.

FIG. 3 is a top view of the hopper showing the inclined track at one side thereof.

Referring now to FIG. 1, I have shown at 2 a metallic spider which may be secured to any machine or base and to which the vibrating unit is secured. A slide mounting plate 3 is rigidly secured to spider 2 and has a slot and key arrangement 4 mounting a motor 5 in such a manner that it can be moved toward and away from the vibrating means. An adjusting screw 6 turns in a bearing 7 to draw the motor back and forth by means of threaded sleeve 8. Mounted on a series of soft grommets 9 is a heavy base plate 10 having a series of four spring mounting blocks such as 11, 12 and 13 rigidly secured to base 10 by means of bolts such as 14. There are four sets of laminated spring sets such as 15, 16 and 17 each consisting of a plurality of heavy spring leaves bolted together with separators between the leaves as at 18. The lower ends of the spring sets are each secured by bolts such as 19 to a slanting surface of one of the blocks 11, 12 or 13 so that the spring sets extend upward at an angle of approximately 60° to the base plate.

Supported on the upper ends of the spring sets is the vibrating plate 20 which has a series of four slanting surfaces such as 21 and 21a to which the upper ends of the spring sets 15 etc. are rigidly secured by bolts such as 22 and 22a. The hopper 23 is supported on the upper side of plate 20 by means of a center bolt (not shown) through hole 24 in hopper 23 and threaded hole 25 in plate 20. The vibrating mechanism for agitating the plate 20 and its hopper 23 consists of a shaft 26 mounted on the underside of plate 20 in bearings 27 and 28 and having a pulley 29 at one end thereof which is linked to the spring loaded pulley 30 on the motor 5 by means of belt 31. On the opposite end of shaft 26 are mounted a pair of eccentric weights 32 and 33 rigidly secured to shaft 26 and rotating therewith to impart a vibratory motion to plate 20 and hopper 23.

The vibration of plate 20 by the eccentric weights 32 and 33 combined with the action of the slanting springs causes small discrete parts in the hopper to follow a spiral circular path as indicated by the arrow in FIG. 3 and the parts also move outward and are thus caused to climb up the track 34 which starts from the widened section blending with the base of the hopper and carries the parts in a row around and up to a discharge position as at 35. It will be understood that the rate of vibration may be varied by turning the adjusting screw 6 to move the motor back and forth on spider 3. As the motor moves closer to shaft 26 and its pulley 29, the belt 31 is made looser or tighter on pulley 30 which therefore causes that pulley to grip the belt 31 looser or tighter to vary the speed of rotation of shaft 26.

It will thus be seen that the unit comprising the hopper 23, the plate 20 and the shaft 26 with the weights 32 and 33, is supported for free vibration on springs 15, 16 etc. The belt 31 connecting it with motor 5 permits such free vibration and the adjustment of the motor toward and away from the shaft of the vibrating unit permits control of the speed of rotation of the shaft. The spring loaded V pulley on the motor rotates the shaft of the vibrating unit at a greater speed as the motor is moved outward away from the unit, to tighten the belt. In the present utilization of my invention, the discrete parts held in the hopper are the push buttons which are to be applied to the tops of the valves on aerosol cans by means of another machine. The buttons are vibrated up and down and around by the joint action of the eccentric weights and the long angularly disposed groups of springs and are caused to climb the circular discharge path or track 34 and arrive one at a time at the discharge point 35.

Having described one embodiment of my invention, what I consider to be new and desire to have protected by Letters Patent, will be pointed out in the appended claims.

What is claimed is:

1. A device for feeding discrete articles from a hopper around a vertically extending and spiral path comprising a cylindrical hopper having a curved path integral with the inner wall thereof extending from the bottom of the hopper around the wall thereof and rising to a discharge point at the top of the hopper, and means for vibrating said hopper comprising a singular horizontal shaft mounted in bearings on the underside of said hopper, a pair of eccentric weights on one end of the shaft and a shaft pulley secured to the other end thereof, a heavy base below said hopper, a series of long flat springs arranged in groups and each having their lower ends secured to said base and extending upward at an angle to said base, and with their upper ends rigidly secured to the underside of said hopper, said groups of springs forming a circle around the bottom of said hopper, a motor slidably mounted relative to said base, said motor having a motor pulley thereon, means for moving the motor nearer to and away from the shaft pulley on the end of said shaft, a belt linking the motor pulley to the shaft pulley, said linkage causing rotation of said shaft and said weights by the motor with consequent vibration of the hopper, said angular springs causing an orbial or rotary movement of the hopper as it is vibrated to thus cause said discrete parts to climb said path to the discharge point.

2. The device of claim 1 wherein said groups of springs each comprise a series of long flat springs with separators between the springs and means for clamping them together as a unit with the length of the springs exending upward from the base to the hopper at an angle of about 60°, and in which the belt pulley on the motor is of the spring loaded type which causes variation in the speed of rotation of the shaft as the motor is moved toward and farther away from the shaft pulley.

References Cited

UNITED STATES PATENTS

| 930,673 | 8/1909 | Manischewitz | 198—76 X |
| 2,705,070 | 3/1955 | Carrier et al. | 198—220 |
| 3,209,900 | 10/1965 | Prutton | 198—220 |
| 2,688,807 | 9/1954 | Ginther | 198—220 |
| 2,916,926 | 12/1959 | Albertson | 74—230.17 |
| 2,927,683 | 3/1960 | Carrier | 198—220 |

RICHARD E. AEGERTER, *Primary Examiner.*

A. C. HODGSON, *Assistant Examiner.*